(12) United States Patent  
Vogelaar et al.

(10) Patent No.: US 12,509,342 B2  
(45) Date of Patent: Dec. 30, 2025

(54) ROBOTIC SYSTEM FOR AUTOMATIC REFUELLING OF VEHICLES

(71) Applicant: Autofuel ApS, Grindsted (DK)

(72) Inventors: Johannes Sijbrand Vogelaar, Niederzier (DE); Erwin Meijerink, Emmeloord (NL); Esben Von Buchwald, Brønshøj (DK); Jonas Thor Olsen, Båstad (SE)

(73) Assignee: Autofuel ApS, Grindsted (DK)

( * ) Notice: Subject to any disclaimer, the term of this patent is extended or adjusted under 35 U.S.C. 154(b) by 25 days.

(21) Appl. No.: 18/259,819

(22) PCT Filed: Dec. 23, 2021

(86) PCT No.: PCT/EP2021/087498  
§ 371 (c)(1),  
(2) Date: Jun. 29, 2023

(87) PCT Pub. No.: WO2022/144300  
PCT Pub. Date: Jul. 7, 2022

(65) Prior Publication Data  
US 2024/0059548 A1 Feb. 22, 2024

(30) Foreign Application Priority Data

Dec. 30, 2020 (EP) .................................... 20217945  
Aug. 16, 2021 (EP) .................................... 21191567

(51) Int. Cl.  
*B67D 7/04* (2010.01)  
*B25J 19/00* (2006.01)  
*B67D 7/84* (2010.01)

(52) U.S. Cl.  
CPC ........ *B67D 7/0401* (2013.01); *B25J 19/0079* (2013.01); *B67D 7/84* (2013.01);  
(Continued)

(58) Field of Classification Search  
CPC .. B67D 7/0401; B67D 7/0407; B67D 7/0409; B67D 7/0411; B67D 7/0415;  
(Continued)

(56) References Cited

U.S. PATENT DOCUMENTS 4,881,581 A * 11/1989 Hollerback ............ B60K 15/04  
222/2  
5,345,480 A * 9/1994 de Magny ............ B25J 19/0079  
376/290

(Continued)

FOREIGN PATENT DOCUMENTS

DE 3601437 A1 7/1986  
DE 3930981 A1 3/1991  
(Continued)

*Primary Examiner* — Nicolas A Arnett  
(74) *Attorney, Agent, or Firm* — DINSMORE & SHOHL LLP

(57) ABSTRACT

A robotic refuelling system and method for automatically operating a fuel station for refuelling vehicles includes a first detection unit for identifying the vehicle, a collaborative robot arm, and an adapter tool connected to the collaborative robot arm. The system is configured for detecting and identifying the vehicle, and controlling the collaborative robot arm and the adapter tool to engage at least one fuel dispenser unit of the fuel station and refuel the vehicle.

27 Claims, 5 Drawing Sheets

(52) U.S. Cl.
CPC ............... *B67D 2007/0407* (2013.01); *B67D 2007/0409* (2013.01); *B67D 2007/0411* (2013.01); *B67D 2007/0415* (2013.01); *B67D 2007/0417* (2013.01); *B67D 2007/0463* (2013.01); *B67D 2007/0473* (2013.01); *B67D 2007/0474* (2013.01)

(58) Field of Classification Search
CPC .. B67D 7/0417; B67D 7/0463; B67D 7/0473; B67D 7/0474; B67D 7/84; B25J 19/0079
See application file for complete search history.

(56) References Cited

U.S. PATENT DOCUMENTS

| | | | | |
|---|---|---|---|---|
| 5,628,351 | A * | 5/1997 | Ramsey, Jr. | B67D 7/145 |
| | | | | 141/94 |
| 6,237,647 | B1 * | 5/2001 | Pong | B67D 7/348 |
| | | | | 141/94 |
| 8,393,362 | B1 * | 3/2013 | Hollerback | B25J 11/00 |
| | | | | 414/730 |
| 12,054,380 | B2 * | 8/2024 | Ramirez | B67D 7/84 |
| 2023/0356994 | A1 * | 11/2023 | Ramirez | B67D 7/106 |

FOREIGN PATENT DOCUMENTS

| | | |
|---|---|---|
| EP | 2053015 A1 | 4/2009 |
| JP | 07101500 A | 4/1995 |
| JP | 2001348099 A | 12/2001 |
| WO | WO-9403391 A1 * 2/1994 | ......... B25J 15/0052 |

* cited by examiner

ROBOTIC SYSTEM FOR AUTOMATIC REFUELLING OF VEHICLES

CROSS REFERENCES TO RELATED APPLICATIONS

This application is a national-stage application under 35 U.S.C. § 371 of International Application No. PCT/EP2021/087498, filed Dec. 23, 2021, which claims benefit of priority to European Patent Application No. 20217945.3, filed Dec. 30, 2020 and European Patent Application No. 21191567.3, filed Aug. 16, 2021.

FIELD OF INVENTION

The present disclosure relates to a robotic refuelling systems and methods for automatically operating a fuel station for refuelling vehicles.

BACKGROUND

Future of mobility brings with many changes in regards to the means how people travel from point A to point B and creates a new ecosystem of personal mobility. Urban planning in large cities is advancing, high technology companies are moving into the production of cars, some players have been demonstrating driverless cars without backup drivers, car-sharing services are spreading out globally.

As a result of technological developments towards environmentally friendly, integrated, automated and personalised travel, there is an urgent need for preparing the technologies around the future of mobility, for example the technology of refuelling the vehicles.

Today, the common practise of refuelling is to use a traditional gas station requiring a manual refuelling system. One of the disadvantage of such a manual refuelling exercise on a manned or an unmanned station is the demand for driver's attention or direct involvement. Hence, such a human interaction while refuelling is not compatible with the future of mobility.

Another disadvantage of today's traditional gas station is that there is a high risk of transmission of bacteria and virus when involving in refuelling, for example when grabbing a fuel nozzle or a fuel dispenser unit since hundreds of people use the same fuel nozzle in each day. An automatic operation of refuelling in a gas station will not only be prepared for the future of mobility but also will help key functions of society in several circumstances, such as in case of a pandemic.

An alternative way for minimizing the human interaction during refuelling operation may be adapting an industrial robot arm. Large companies have already been using autonomous self-driving transport robots in industrial production in various fields. These robots are generally powerful; hence, safety has been an extremely important concern. Therefore, industrial robots are equipped with an external security system comprising sensors for supervising the motion of the robot manipulator while maintaining a distance with an object, such as a worker.

One disadvantage of the external safety system is that the operation pursued by the industrial robot may be aborted due to external factors such as dust, rain or snow, limiting the use of industrial robots. Thus, there is a great demand for a technological solution for refuelling vehicles automatically and smoothly while providing a secure process.

SUMMARY

The present disclosure concerns a robotic refuelling system for automatically operating the operation of refuelling vehicles. With the present disclosure, the driver is relieved from the refuelling task and given more freedom. The robotic refuelling system disclosure not only helps to solve a problem in content of the pandemic but also provides an enhanced refuelling system with full automation. Such an automation complies with future of mobility and eliminates a human interaction or involvement during refuelling of vehicles. Furthermore, the disclosed system fulfils the safety requirements without a need for an external safety system.

It is therefore an object of the present disclosure to obtain a fully automated system for refuelling vehicles. However, such an automation oftentimes requires an advanced robot arm, which brings along strict safety requirements and external safety systems.

It is a further object of the present disclosure to provide a system wherein the way of operating the refuelling procedure is simplified.

It is a further object of the present disclosure to provide a system configured to provide a predetermined energy source or fuel type to a vehicle, wherein the energy source is selected from a variety of energy sources.

It is yet a further object of the present disclosure to operate, i.e. start, monitor, and finish a refuelling procedure through a system that fulfils the safety requirement such that an external safety system is not required.

Therefore, in a first aspect, the present disclosure relates to a robotic refuelling system for automatically operating a fuel station for refuelling vehicles, comprising:
  A first detection unit for identifying the vehicle,
  A robot arm,
  An adapter tool connected to the robot arm,
  wherein the system is configured for
    detecting and identifying the vehicle, and
    controlling the robot arm and the adapter tool to engage at least one fuel dispenser unit of the fuel station and refuel the vehicle.

In general, the present disclosure relates to a refuelling system for automatically refuelling vehicles, primarily cars. The presently disclosed refuelling system employs a first detection unit, robot arm and an adaptor tool associated with the robot arm.

Preferably, the system can be characterised in that the detection unit comprises one or more optical sensor(s) to detect the vehicle, check the orientation of the vehicle and identify the specifications of the vehicle, such as the location of the fuel door or fuel tank flap and the fuel type that the vehicle consumes.

Additionally, a second detection unit can be configured to identify the positioning of the wheels of the vehicle, wherein the first and the second detection units may be the same. The system further can comprise a communication unit configured to process the signals provided by the detection units and to provide information to the robot arm regarding the relative position of the fuel door with respect to the fuel dispenser unit of the identified fuel type located on a fuel island.

An advantage of the presently disclosed system is that, the system can be suitable for various types of fuel sources such as diesel, electricity, natural gas or hydrogen. Therefore, the system is configured to automatically provide the energy that the vehicle uses to the vehicle. The system can be further configured for engaging the adaptor tool with the fuel dispenser of the identified fuel type, optionally for opening the fuel door from an initial state to an open state, wherein the fuel inlet is ready for a fuel intake, for providing the fuel dispenser to the fuel inlet of the vehicle, and for activating the fuel dispenser so that fuel is provided to the vehicle.

When refuelling is completed, the adaptor tool can position the fuel dispenser unit on the fuel island. Furthermore, the adapter tool can be configured for setting the fuel door of the vehicle to the initial state of the fuel door.

Another advantage of the presently disclosed system is that the robot arm can be of a kind, which can work among humans, such as a collaborative robot or a cobot or a cobot arm. Preferably, the robot arm can be configured such that the robot arm can fulfil the safety requirements for operating in a close proximity with humans and provide a fully automated refuelling operation. Thus, the system can avoid unexpected stops due to external factors while operating the system safely and continuously. The collaborative robot or the cobot can be a non-essential feature of the present invention. Throughout the present application, any embodiment comprising a robot arm may be amended by comprising a cobot arm instead.

The term cobot should be understood to be a collaborative robot as understood within the field being intended for direct human robot interaction within a shared space, or where humans and robots are in close proximity, where the safety of the cobot may rely on lightweight construction materials, rounded edges, and inherent limitation of speed and force, or on sensors like force sensors and software that ensures safe behaviour. Alternatively or in addition, the term cobot should be understood to be a robot without an external safety system, wherein the external safety system is to be understood as a system that monitors the surroundings for external objects to be avoided and/or a fence for preventing humans to approach the robot.

Yet another advantage of the presently disclosed system is that the system adds-on to an existing dispenser and does not require any modification or human interaction before, during and/or after refuelling. This foresees that, the presently disclosed invention of robotic refuelling solution can be integrated in an existing fuel island for example in the fuel island of a gas station. An important advantage of the disclosed invention is that the system can also be integrated to other locations, such as parking garages, drive-through restaurants, streets, parking lots or any other locations with an access to an energy source and an energy dispenser.

Advantageously, the system can be further configured for handling the payment. This foresees further that, the system can be suitable for autonomous vehicles. Furthermore, the system can communicate with the vehicle and give instructions to the vehicle when the vehicle can drive off.

In a second aspect, the present disclosure relates to a method for automatically refuelling vehicles, comprising the steps of
- providing a first detection unit for identifying a vehicle,
- providing a robot arm connected to an adaptor tool,
- engaging the adaptor tool with at least one fuel dispenser unit,
- refuelling the vehicle by controlling the robot arm and the adaptor tool for engaging the fuel dispenser unit with a refuelling inlet of the vehicle.

Furthermore, the presently disclosed method can be configured to execute the systems as described herein.

DESCRIPTION OF THE DRAWINGS

The invention will in the following be described in greater detail with reference to the accompanying drawings.

DETAILED DESCRIPTION OF THE INVENTION

Figure 1:
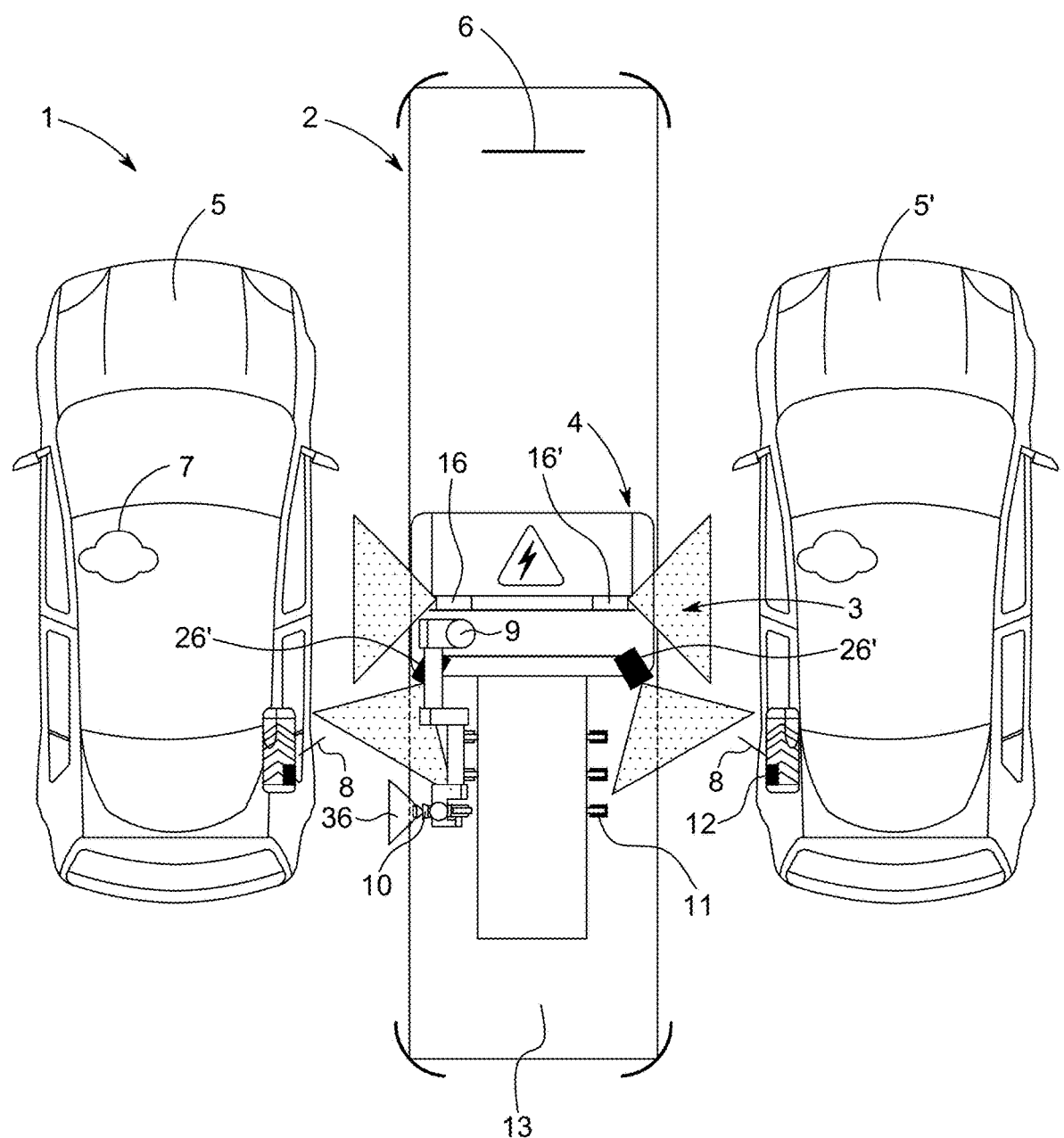
FIG. 1 shows one embodiment of the robotic refuelling system for automatically operating a fuel station.

As used herein, the term fuel dispenser unit refers to an apparatus that dispenses fuel to a vehicle. Some of the fuel dispensers provide liquid fuels such as petrol, diesel, kerosene, oil into the vehicle, while some of the fuel dispensers provide gaseous fuel such as hydrogen. Yet some other fuel dispensers provide fuel in alternative forms such as electricity. Hence, the design of the fuel dispenser may differ in accordance with the fuel type that the vehicle consumes.

As used herein, the term fuel island refers to an area on which one or more fuel dispenser unit(s) is/are located. Each fuel dispenser may be connected to a storage tank of a specific fuel type. Fuel dispenser(s) on a fuel island may be provided such that two rows of fuel dispenser(s) locate each sides of the fuel island. Vehicles therefore can park to either side of the fuel island for refuelling.

As used herein, the term fuel door refers to a part of the vehicle, such as a cap on the car body, which hides a fuel inlet. Typically, the fuel can be provided through the fuel inlet that may be positioned behind the fuel door.

As used herein, the term refueling refers to proving an energy source. This means that refueling may refer to providing fluid fuels, gaseous fuels or fuels of various energy sources such as electricity.

As used herein, the term fuel station refers to a system comprising a fuel island, a vehicle and a source of a fuel. Thus, fuel station can be a station where a single or a plurality of energy sources may be provided. This foresees that the fuel station can be located in a gas station, shopping mall, parking lot, side of a street, etc.

In a first aspect, the present disclosure relates to a system for a robotic refuelling, wherein a fuel station can be operated automatically for refuelling vehicles, such as cars, trucks, motorcycles. The system can comprise at least one first detection unit. In an embodiment, the vehicle can drive with a predefined driving direction and park relative to a fuel island such that the detection unit can identify the direction of the vehicle relative to the predefined riding direction. In a specific embodiment, the detection unit can identify the vehicle wherein the specifications of the vehicle, such as brand, fuel door position, fuel type of the vehicle are acquired. The system can further comprise a robot arm and an adapter tool connected to the robot arm. The system can be configured such that the adapter tool engages with the fuel dispenser of the predefined fuel type to refuel the vehicle. The system is therefore configured to operate a fuel station automatically, wherein the robot arm can operate safely alongside humans.

Detection Unit

In an embodiment, the first detection unit can identify the vehicle. Preferably, the first detection unit may identify the orientation of the vehicle. If the orientation of the vehicle does not correspond with the predefined drive-in direction, the system can communicate with the vehicle, such that the system can guide the vehicle or the driver to position the vehicle in accordance with the predefined orientation. The system can be further configured to guide the vehicle or the driver for parking the vehicle within a predefined parking area.

Advantageously, the first detection unit can be configured to identify the type of the vehicle. Preferably, the detection unit may comprise at least one scanning unit to scan the license plate of the vehicle. This foresees that the first detection unit can be located such that the first detection unit can optically scan the front or the back license plate of the vehicle.

Additionally, specifications of the vehicle can be identified in accordance with the scanned license plate. More specifically, when the license plate is scanned, the system can recognize the brand of the vehicle, the fuel type that the identified vehicle consumes and location of the fuel door or the fuel inlet. One advantage of this embodiment is that the system can provide an initial information regarding the location of the fuel door, e.g., at the back of the car body, at the front of the car body, avoiding the need for searching for the fuel door around the entire vehicle. Hence, in an embodiment, the system can store information regarding the vehicle specifications in accordance with the license plate.

In a preferred embodiment, the system can be configured to monitor and communicate the position of the vehicle in accordance with the fuel dispenser unit. In a further embodiment, the system can comprise at least a second detection unit configured to identify a wheel of the vehicle, such that the positioning of the vehicle is determined. Thus, the system can identify the fuel door, such that the positioning of the fuel door can be detected in accordance with the positioning of the vehicle. Specifically, the second detection unit can detect optically positioning of at least one wheel. In a preferred embodiment, the second detection unit can be configured for capturing an image of at least a rear wheel and/or a front wheel of the vehicle for determining the position of the vehicle. In an advantageous embodiment, the system can be configured for locating the fuel door of the vehicle based on the captured image by the second detection unit.

The system can, for a certain identified vehicle, have the coordinates of the fuel-door of the vehicle relative to the front wheel and/or the rear wheel stored in a database so that by determining the position of the front wheel and/or the rear wheel the actual coordinates of the fuel-door can be determined. In an advantageous embodiment, the second detection unit may be one or more cameras such that the camera can capture the image(s) of the wheel(s) of the vehicle. By detecting the position of the front/rear wheel the position of the vehicle can be determined exactly. Advantageously, the camera(s) may be a wide-angle camera and can capture the position of the back and/or the front wheel. Wide-angle cameras may comprise an ultra-wide-angle lens that produces strong visual distortion while capturing a wide panoramic image of the entire vehicle. The system can be configured such that said distorted image data can be processed to straighten the image of the distorted vehicle. The system can be further configured for detecting an object in an image. For example, a machine-learning algorithm may learn plurality of vehicles, and wheels. The machine-learning algorithm may therefore also learn the position of the fuel door in accordance with a wheel of a vehicle. Thus, when a straighten vehicle image is provided, the algorithm can recognize the wheel. After detecting the wheel, the system can determine the coordinates of the fuel door. In addition, based on the captured image through the wide-angle lens, the whole vehicle can be seen so that the orientation of the vehicle in relation to the fuel island can be determined. The vehicle does not necessarily need to be parked exactly parallel to the fuel island; the front end of the vehicle can be closer to the fuel island than the rear end of the vehicle, or vice versa.

In an embodiment, the first detection unit and the second detection unit can be the same detection unit.

Robot Arm

A system for automatically operating the fuel station may comprise various types of robot arms. In an embodiment of the present disclosure, the robot arm can be a collaborative robot arm, i.e. a cobot arm. One advantage of the collaborative robot arm is that the collaborative robot is designed to work among humans and provides a flexibility to work safely outside of a dedicated work cell. Thus, in an embodiment, the robot arm can be configured to operate without a separate external safety system.

The operational characteristics of the collaborative robot arm may be different from industrial robot systems. In collaborative operations, wherein a collaborative robot arm is used, operators can work with the robot system while the robot is powered and physical contact between the robot and the operator can take place in the collaborative workspace. Risk assessment of the collaborative robot arm is well described in various standards and regulations, like e.g. ISO 10218-1, 10218-2 and ISO/TS 15066. The collaborative robot arm of the present disclosure may be a collaborative robot arm described by any of, any combination of, or all of ISO 10218-1, ISO 10218-2 and/or ISO/TS 15066.

ISO 10218-2 describes the collaborative robot as a robot designed for direct interaction with a human within defined collaborative workspace, while the collaborative workspace is defined as a workspace within the safeguarded space where the robot and a human can perform tasks simultaneously during production operation.

A manufactured collaborative robot arm therefore has safety approvals to work along humans.

In general, a robot arm with a reach of about 1600 mm may weigh around 250 kg with a payload capacity, i.e., the amount of mass that a robot arm wrist can support, of around 25 kg. An advantage of a collaborative robot arm is that a cobot arm in general can have a lightweight of less than 70 kg, or less than 60 kg or less than 50 kg, or less than 40 kg. Moreover, the cobot arm can have a reach of around or less than 1300 mm. The cobot arm can also have a payload capacity of not more than 10 kg. This foresees that the amount of mass that a cobot arm can support may be less than 5 kg, preferably less than 4 kg, while the cobot arm itself can weigh less than 40 kg. An advantage of the cobot arm is that in general the weight of the cobot arm and the payload associated with the cobot arm is lightweight. Furthermore, the cobot arm can preferably have an operating speed of less than 250 mm/s. Thus, a combination of a lightweight structure of a cobot arm and a supported mass, as well as a low speed can mean a reduced kinetic energy, which poses a significantly decreased risk of injury while working alongside with an operator and therefore does not require an external safety system due to the significantly reduced lightweight construction. This implies that the kinetic energy provided by a system comprising a cobot arm cannot harm an operator of the system. Thus, the system can run safely without an additional safety measures such as external safety systems.

The collaborative robot arm can have many axes of rotation around which one part of the arm can be rotated in relation to another part of the arm. The collaborative robot arm according to the ISO 10218-1 is and according to the present robotic refuelling system can be designed so that the axes are capable of being moved without the use of drive power. Moving the axes can be carried out by a single person. The robotic refuelling system with the collaborative robot arm can be taught to find the fuel door of a new vehicle not yet stored in the database of vehicles with the location of the fuel door of each vehicle by a person moving the collaborative robot arm when the position of the vehicle is determined by the robotic refuelling system. In addition, the robotic refuelling system with the collaborative robot arm can be taught to find a mouth of a fuel inlet behind the fuel door as well as the inclination of the fuel inlet of the new vehicle. This can be achieved by the person moving the collaborative robot arm to the position, where the fuel dispenser held by the collaborative robot arm is positioned in the fuel inlet.

List of hazards in robotic systems may be related to the robot characteristics, such as load carrying capacity, system characteristics, such as operator motion, fixture design and process characteristics, wherein the robot arm is used. Due to this interplay between various parameters, one of the challenges of the current robotic technology is to meet the safety requirements of a robotic system, specifically for operating a fuel station. Furthermore, risk assessment of collaborative systems in an explosive environment can be different in each country.

The present disclosure can fulfil the safety requirements and regulations that a robotic system must meet for automatically operating a fuel station for refuelling vehicles. The system is developed so as to meet the safety requirements in various countries. The robotic system disclosed hereby can solve the problem of providing an efficient and safe refuelling operation. The developed system consider all aspects of a robotic system and relation to each other such that a collaborative robot arm can be operated within the disclosed system while fulfilling the safety conditions on a fuel station.

The robot arm, such as the collaborative robot arm, to be used in the robotic refuelling system, can in addition to the safety approvals to work along humans, have further security measures in a refuelling operation to avoid the risks of explosion and initiation of a fire at a fuel station.

Flammable gases, mists or vapours may result in an explosive atmosphere. If there is enough of the flammable substance mixed with air, a source of ignition causes an explosion. An intended use of a system in potentially explosive atmospheres therefore requires degrees of protection determined by the zone classification for improving the safety and health protecting of workers, customers or goods potentially at risk from explosive atmospheres. The system therefore can comprise several features for securing a safe zone. In an embodiment, the robot arm can be pressurised such that a predefined pressure level above atmospheric pressure in cavities, where electronics is located, is maintained. For example, the robot arm may be over-pressurized such that any explosive or a dust particle cannot penetrate and impair the function of the robot arm.

Thus, the present disclosure further relates to a collaborative robot arm being used in an explosive environment, wherein the collaborative robot arm comprises electronics contained in one or more housings with one or more openings and a pressurization system configured for pressurizing the housing(s) with a gas at a predefined pressure level above atmospheric pressure. In a preferred embodiment, the predefined pressure level can be at least 0.8 mbar above atmospheric pressure, preferably between 0.8 mbar-15 mbar, more preferably between 1 mbar-10 mbar, most preferably between 2 mbar-5 mbar. In an alternative embodiment, the predefined pressure level can be at least 2 mbar above atmospheric pressure. The one or more housings can be an external housing(s) attached to the collaborative robot arm. In addition or alternatively, the collaborative robot arm can be hollow forming the housing(s) containing the electronics. The opening(s) can be well-defined openings with well-defined diameters for providing a well-defined leakage of the gas for providing a well-defined flow rate of the gas through the housings. The housing can be tight; however, there will always be openings through which the gas can seep at least over a longer time. The opening(s) can be opening(s) that is/are not well-defined, so that the right pressure and/or flow-rate is achieved by controlling the pressure of the pressure source providing the gas under pressure.

In an embodiment, the pressurization system can be configured for purging the collaborative robot arm by a predefined purge volume before electronics of the collaborative robot arm is reactivated. In a preferred embodiment, the purge volume can be between 10-200 l, preferably 20-150 l, more preferably 30-100 l, most preferably between 50-90 l. In a further embodiment, the gas may be air.

Additionally, the present disclosure further can relate to the use of the disclosed collaborative robot arm being used in an explosive environment, wherein the collaborative robot arm is pressurised such that a predefined pressure level above atmospheric pressure in said collaborative robot arm is maintained.

Additionally purging and pressurising may be applied to other parts of the refuelling system, such as adaptor tool and/or detection unit and/or any parts comprising electronics and may require safety precautions.

Generally, in an embodiment, the system can comprise a pressurization system. The pressurization system may comprise a measurement module such as a control unit for measuring the pressure and a proportional valve connected to a pressurization medium such as air. The pressurization system may comprise a pump for creating a pressure above atmospheric pressure, or a gas, like e.g. air, under pressure like a gas cylinder for providing the gas/air with a pressure above atmospheric pressure.

In an embodiment, the pressurization system can be configured for pressurising the collaborative robot arm and/or the adaptor tool and/or a detection unit, such as a camera, and optionally for maintaining a predefined pressure level above atmospheric pressure.

In a further embodiment, the predefined pressure level can be at least 0.8 mbar above atmospheric pressure, preferably between 0.8 mbar-15 mbar, more preferably between 1 mbar-10 mbar, most preferably between 2 mbar-5 mbar, alternatively the predefined pressure level is at least 2 mbar above atmospheric pressure.

In a preferred embodiment, the pressurization system can be configured to purge the collaborative robot arm and/or the adaptor tool and/or a detection unit prior to automatic refuelling operation if the system was turned off. Thus, in order to turn on the robotic refuelling system, after being turned off, the pressurization system can purge the refuelling system, preferably the adaptor tool, the robot arm and the detection unit, by providing a pressurized medium until the flammable gases exit the refuelling system. This foresees that each of the collaborative robot arm, the adaptor tool and the detection unit can comprise a sealed, airtight body wherein the pressurization medium runs through, or each of the collaborative robot arm, the adaptor tool and the detection unit can comprise an unsealed, non-airtight body wherein the pressurization medium runs through.

In an embodiment, the purging medium can be air. Preferably, the pressurized air can be provided from the pressurization system into the adaptor tool through a tube. Another tube between the adaptor tool and the robot arm can guide the pressurized air from the adaptor tool to the robot arm. The pressurized air can run through the entire length of the robot arm to the bottom of the robot arm from where another tube can connect the robot arm to the detection unit, e.g., second detection unit(s). Purging has a great advantage of removing flammable gases from the refuelling system and providing a safe working environment before performing the refuelling operation by means of a robot arm.

The control unit of the pressurization system can detect when the purging volume reaches to a predetermined volume. Consequently, the refuelling system can be turned on. In an embodiment, the purging volume can be between 50-100 l. This foresees that the purge volume of between 50-100 litre can be provided to the refuelling system. Preferably, the purging procedure can be repeated. In an embodiment, purging of the collaborative robot arm and/or the adaptor tool and/or a detection unit prior to automatic refuelling operation if the system was turned off can be repeated at least twice, preferably at least 3 times, more preferably at least 5 times.

After the purging is completed and the refuelling system is turned on, the collaborative robot arm and/or the adaptor tool and/or a detection unit can further be pressurized continuously. Thus, in a preferred embodiment, the pressurization system can be configured such that the collaborative robot arm and/or the adaptor tool and/or a detection unit, such as a camera, are pressurised and maintained at a predefined pressure level above atmospheric pressure. In a further embodiment, the predefined pressure level can be at least 0.8 mbar above atmospheric pressure, preferably between 0.8 mbar-15 mbar, more preferably between 1 mbar-10 mbar, most preferably between 2 mbar-5 mbar. An advantage of continuous pressurization of the refuelling system can be avoiding any flammable gases entering the system. In an alternative embodiment, the predefined pressure level can be at least 2 mbar above atmospheric pressure.

Presently disclosed approach therefore can offer a unique solution for automatically operating a fuel station, because presently disclosed approach meets the safety requirements of a fuel station defined by various safety zones. Safety requirements defined by various countries were gathered together in order to offer a worldwide solution for offering a robotic refuelling system for automatically operating a fuel station for refuelling vehicles. Specifically, a robot arm can pose various configurations during a refuelling operation. The presently disclosed approach can also take the orientation of the robot arm into consideration for offering an all-time safe zone.

In an alternative embodiment, the robot arm can comprise a sleeve surrounding at least a part of the robot arm. The sleeve can prevent combustible gases to reach the robot arm, so that any spark produced during movement of the robot arm cannot ignite combustible gases. Preferably, a threshold pressure level above atmospheric pressure in the sleeve can be predefined and the sleeve can be configured to maintain the threshold pressure level to further eliminate the risk that combustible gases reach the robot arm. Advantageously, a pressure sensor can measure the pressure level in the robot arm such that when the pressure level drops below the threshold, for example below 10 mbar above atmospheric pressure, the collaborative robot arm can be de-energized. One advantage is that the system may be that the system can be configured to avoid an explosive zone by shutting down the electronics of the system in case of a leakage above a predefined limit. The present disclosure therefore can contribute to operating the automatic refueling securely and continuously.

Another advantage of the presently disclosed collaborative robot arm is that the collaborative robot arm can be a lightweight unit with reduced electronics compared to industrial robots. Furthermore, collaborative robot arm can provide high movement capabilities. In an embodiment, the collaborative robot arm can have six degrees of freedom.

Adapter Tool

The present disclosure further comprises a robot arm-end tool, such as an adaptor tool engaging with one end of the robot arm. In an embodiment, said adapter tool can comprise a connector configured to connect to the fuel dispenser unit. Preferably, the adaptor tool can further comprise a fuel door-operating device configured to engage with the fuel door of the vehicle, such that the fuel inlet is accessible.

In an embodiment, the system can be configured to detect the position of the fuel door of the vehicle relative to the wheels of the vehicle and send signals to the robot arm relating to said relative position. The present disclosure can be further configured to bring the fuel door-operating device to the fuel door and activate the fuel door such that the fuel inlet of the fuel door is available to receive fuel. In one embodiment, the fuel-door operating device can engage with the fuel door mechanically for enabling a fuel receive. In a preferred embodiment, the fuel door operating-device can contact to the fuel door, preferably by a vacuum means such that the fuel door can be sucked, and the fuel door can operate opening and closing by pivoting the fuel door.

In an advantageous embodiment, the movement plan of the robot arm can be calculated. A sensor means can be adapted to detect the position of the fuel dispenser unit relative to the current position of the robot head and to send to the system a signal relating to said relative position such that said connector means can connect with the fuel dispenser unit and place the fuel dispenser unit in the fuel inlet.

Advantageously, the connector may be configured such that the adaptor tool engages with the fuel dispenser units of various fuel types. Further developments in the growing market of alternative fuels such as LNG, Electric charging and Hydro oxygen, forces the fuel retail industry to look at new technologies and developments in order to stay relevant. In an embodiment, the adaptor tool can be adaptable to conventional fuels such as petrol, diesel or non-conventional fuels such as hydrogen, electricity. This foresees that the design of the connector may be flexible to accommodate a connection with fuel dispensers with different geometries.

In an embodiment, said adapter tool can further comprise an activator for activating the fuel dispenser such that the fuel dispenser operates refuelling. The activator may comprise a mechanical mean, such as a gun-like mechanism, wherein a handle is mechanically activated for initiating a refuelling operation. In another embodiment, the activation can take place by providing the fuel dispenser in the fuel receiving part of the vehicle. This foresees that in one embodiment, the system can comprise an activator, wherein the activator can be a part of the adaptor tool that engages with the fuel dispenser and can provide a connection between the fuel dispenser and the fuel receiving part of the vehicle.

In an embodiment, the system can comprise a fuel inlet adapter attachable to a mouth of a fuel inlet of the vehicle, wherein the fuel inlet adapter can comprise a ring with a spring biased lid for keeping the lid shut, wherein the lid can be configured for allowing the fuel dispenser unit to enter the fuel inlet but preventing petrol fumes to evaporate.

The fuel inlet adapter may preferably have a seal against which the lid rests in the closed position for totally preventing petrol fumes to evaporate. Many cars have a fuel cap behind the fuel door, wherein the fuel cap is screwed onto the mouth of the fuel inlet. This fuel cap can preferably be replaced by the adaptor, so that the robot does not need to unscrew the fuel cap. In that way the refuelling time can be shortened.

In a further embodiment, the system can be configured to stop refuelling automatically. An automatic stop can be provided by sensing a shut-off of the fuel dispenser. Alternatively, a time stop or a fuel intake amount can be defined previously. In an embodiment, the system can comprise a communication means such that when refuelling is completed, the activator can be released for deactivating the fuel dispersion.

In an advantageous embodiment, the adaptor tool may comprise a third detection unit for monitoring the positioning of the fuel dispenser in the fuel door. However, the first and/or the second and/or the third detection units may be the same.

One advantage of the present disclosure is that in one embodiment, the system can be configured to start, monitor and finish a refuelling process such that the system is transmitting and receiving data signals, the data concerning the refuelling procedure. Thus, it may be possible to integrate the present disclosure in an existing infrastructure without the need of investing in new dispensers or electrical charging units.

Cabinet

In an embodiment, a cabinet on the fuel island can accommodate the robot arm, the adaptor tool and electronics of the system.

In one embodiment, the cabinet can comprise a door, wherein the door automatically opens when a vehicle is detected. The door can be automatically locked so that the door cannot be opened by force when the system is off. This feature foresees that when the system is not in-use, the robot can be stored safely. Furthermore, a waterproof cabinet may decrease the risk of a corrosion of the parts of the system.

In an embodiment, the system can further comprise a table configured to carry the robot arm, wherein the cabinet comprises the table. In a preferred embodiment, the table can be a rotary table. In a further embodiment, the table may be configured to rotate at least 180°. This has the advantage that the table can be configured to provide an extra degree of freedom to the robot arm, such that the rotation of the table corresponds to an extra, e.g., a 7th, degree of freedom of the robot arm. That the table can be configured to rotate at least 1800 means that the robot arm can then be turned from one side of the cabinet to the other side providing an engagement of the adaptor tool with the dispenser units at both sides of the fuel island. One single robot arm then can provide the flexibility of operating both sides of the fuel island.

Preferably, the rotatable table can engage with the cabinet door. When the table rotates so that the robot arm can e.g., moved to the left, the door opens on the left side of the cabinet at the same time.

The positioning of the robot arm in accordance with the rotary table can be calculated such that the system can automatically operate refuelling. Specifically, the desired poses of the robot arm for acquiring the desired actions during automatic refuelling requires a set of kinematic calculations. In an embodiment, the robot arm can be attached to the table with an angle between 10°-80°, preferably between 20°-70°, more preferably between 30°-60° relative to the normal of the table. The choice of an angular configuration depends on several parameters such as a relative location of the robot arm with respect to the fuel dispenser unit. In a preferred embodiment, the robot arm can be attached to the table with an angle of preferably between 30°-60°, most preferably 450 relative to the normal of the table. An advantage of this angular configuration can be that the collaborative robot arm can efficiently reach to at least one fuel dispenser on each side of the fuel island.

In an embodiment, the robot arm can engage with the table with an offset. This has the advantage that the robot arm can be positioned away from the centre of the table such that an extra reach of robot arm can be gained. In an embodiment, the offset can be at least 25 mm, preferably at least 50 mm, preferably at least 75 mm, and more preferably at least 100 mm. In an embodiment, the offset can be at least 150 mm.

In another embodiment, a slider mechanism can be adapted for sliding the robot arm out of the cabinet on at least one side and preferably on both sides to provide an extra reach to the robot arm. Similar to the angular configuration, the offset value can be arranged in accordance with the number of fuel dispenser units and the position of the robot arm or the cabinet with respect to the fuel dispenser unit. In a preferred embodiment, the offset can be arranged on the rotary table. One advantage of the offset and/or a slider can be that the robot arm can efficiently reach to at least a second or at least a third or at least a fourth fuel dispenser of the fuel island.

An advantage of the present disclosure is that the combination of offset and an angular configuration of robot arm can give an extra benefit of providing a flexible refuelling system adaptable to many existing fuel islands of fuel stations, wherein the robot arm can reach to and operate the dispenser units at one side (one row) of the fuel island.

Furthermore, the cabinet can be installed on the fuel island without requiring any extra safety measures. The system can be designed to be an add-on to a fuel island; hence, it can be placed on an existing fuel island and can work on both sides of the fuel island, which enables the system to fill up vehicles with fuel doors on either side of the vehicle.

Advantageously, the height of the robot arm and electronics can be arranged such that an enhanced safety zone with a reduced risk of explosion is provided. It may be desirable to place the electronics above a ground level for providing a safer zone for electronics away from an explosive source. In a preferred embodiment, the electronics can be 1.2 meter above the ground level.

In order to reduce the risk of explosion further, the density of released flammable gases can be controlled or reduced by a ventilation system.

In an embodiment, the cabinet can comprise at least one hole on at least one outer lower surface and at least one hole on at least one outer upper surface. Flammable gases may be typically heavier than air; they may collect towards the bottom of a system. Providing the holes on the surface of the system, more preferably on the bottom-outer surface of the cabinet may lead the flammable gas to collect and release from the bottom of the cabinet, while fresh air can enter the cabinet through the hole(s) at the upper surface. In a further embodiment, the rotary table can comprise multiple holes for decreasing the flammable gases collecting around the robot arm.

Alternatively, some flammable gases such as hydrogen can collect around an upper region of the cabinet. Thus, in an alternative embodiment, the cabinet may comprise ventilation holes around the upper surface.

Another advantage of the presently disclosed system is that customer identification and payments can be handled automatically.

Additionally, a part of the cabinet can be made of steel sheet metal parts, which can be coated against corrosion. A part of the adapter tool and cabinet can additively be manufactured from a strong and stiff material. Said material may for example a plastic material, giving the possibility to produce complex parts with lightweight and high structural strength. Alternatively, a lightweight metal such as aluminium can be milled. Preferably, the majority of the adaptor tool can be made of aluminium, which may be nickel plated for providing a desired surface resistivity while meeting the desired explosion regulation.

DETAILED DESCRIPTION OF DRAWINGS

The present disclosure will now be described more fully hereinafter with reference to the accompanying exemplary embodiments shown in the drawings when applicable.

However, it is to be noted that the presently disclosed system and method may be embodied in various forms. The hereby provided embodiments are to guide a thorough and complete disclosure. Hence, embodiments set forth herein should not be interpreted as limiting but be construed as a tool for delivering the scope of the invention to those who are skilled in the art. Same reference numbers refers to the same element throughout the document.

FIG. 1 shows one embodiment of the presently disclosed robotic refuelling system for automatically operating a fuel station 1 for refuelling vehicles. A vehicle 5 is positioned next to a fuel island 2. Detection of the vehicle 5 may be provided by means of an optical sensor, such as a scanner. In this embodiment, the optical sensor is positioned preferably with an access to the license plate of the vehicle 5. The optical sensor may be integrated within a screen unit 6 or located at the side or top of the screen unit 6. Alternatively, two cameras (not shown) on both sides of the screen unit 6 may be configured to detect and identify the vehicle 5, such that the license plate of the vehicle 5 parking in any side of the fuel island 2 can be recognized. The screen unit 6 is located towards one end of the fuel island 2 and preferably visible from both sides of the fuel island 2.

The fuel island 2 further comprises a cabinet 4. At least one camera 16 at the bottom of the cabinet 4 is used to identify the positioning of the vehicle 5. The camera 16 is located such that it can capture the images of the side of the vehicle 5, specifically the position of the wheels of the vehicle 5. Alternatively, the camera 16 can capture the image of the entire vehicle 5. The camera 16 can be positioned opposite to a wheel of the vehicle 5. A second camera 16' at the bottom of the cabinet 4 and at the opposite side of the fuel island 2 is provided such that images of another vehicle 5' positioned at the other side of the fuel island 2 can be captured.

The system is configured for giving instructions to the vehicle 5 or a driver 7 such that the vehicle 5 is positioned within a predefined area and with a predefined orientation. This communication may be provided by means of the screen 6. The screen 6 can be preferably at a higher height so that the driver 7 can easily see the instructions appear on the screen 6.

Furthermore, the cabinet 4 stores a robot arm 9. The robot arm 9 is engaged with the cabinet 4 by means of a table and connector means 3 such as a frame. The frame may be a slider or a rotational arrangement such a rotational table. At the other end of the robot arm 9, it is connected to an adapter tool 10.

The system is further configured such that the system sends a pre-selected payment details to the client's payment system for verification. After verification, the robot arm 9 opens a fuel door 8 of the vehicle 5, takes out a fuel dispenser unit 11, which is connected to a fuel source 13. The system comprises fine positioning cameras 26, 36 for identification of positioning of the wheel and the fuel door 8 with respect to the wheels of the vehicle and for guiding the positioning of the fuel dispenser unit 11 to a fuel inlet 12. One or more fine positioning cameras 26 are assembled in accordance with the robot arm or the cabinet, whereas one more other fine positioning cameras 36 are assembled inside the adaptor tool 10. In this embodiment, a pair of fine positioning cameras 26, 26' can be provided within the cabinet 4 at both sides of the cabinet 4 and can be used for finding the positioning of the wheel. This implies that the cameras 16, 16' and the pair of fine positioning cameras 26, 26' may be same and used for finding the wheel or the car body and for finding the positioning of the wheel. Additionally, another fine positioning camera 36 is assembled inside the adaptor tool 10 and can be used for guiding the positioning of the fuel dispenser unit 11 to a fuel inlet 12.

In another embodiment, the camera 16 can be the same as the fine positioning camera 26. The camera 16 and/or 26 therefore locates at the bottom of the cabinet 4 and can capture at least one image of the vehicle 5. The refuelling system can be configured such that the positioning of the wheel can be identified by means of said image.

In some cases, the fine positioning cameras are assembled only inside the adaptor tool. Furthermore, the system is further configured such that when the fuel dispenser unit 11 is positioned in to a fuel inlet 12, the fuel dispenser unit 11 is unlocked and refuelling starts. System further senses a shut off or a stop signal on a timeout or a pre-selected amount of fuel. The fuel dispenser unit 11 is taken out of the fuel inlet 12 and the fuel dispenser unit is returned back to the fuel island 2. The fuel door 8 of the vehicle 5 is closed and the system sends instructions to the driver 7 that the vehicle can drive off. When the detection unit identifies the vehicle, information about the position of the fuel door 8 can be acquired to guide the robot arm 9 to the right position of the vehicle for opening the fuel door 8. The fine positioning cameras 26, 36 help to guide the robot arm 9 the last few steps before connecting to the fuel door 8. Alternatively, the camera 16 identifies the positioning of the vehicle 5 so exactly, that the robot arm 9 can correctly find fuel door without the assistance from the positioning cameras 26, 36. That is at least possible when the camera 16 is set to identify the positioning of a wheel of the vehicle 5.

Figure 2:
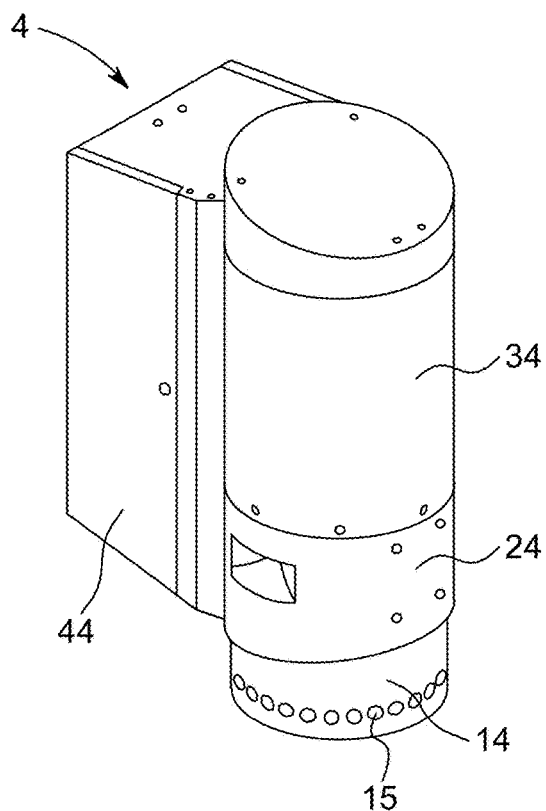
FIG. 2 illustrates one embodiment of the cabinet comprising a cabinet door.

FIG. 2 is one embodiment of the cabinet 4 comprising a cabinet door 34. The cabinet stores the robot arm 9 and the adaptor tool 10. When the system is off or in stand-by modus, the robot arm 9 and the adaptor tool 10 are completely enclosed by a main housing, e.g., cabinet 4, and will not be accessible without breaking the cabinet 4. Electronic components are stored inside an electronic cabinet 44, positioned above the ground level.

Figure 3:
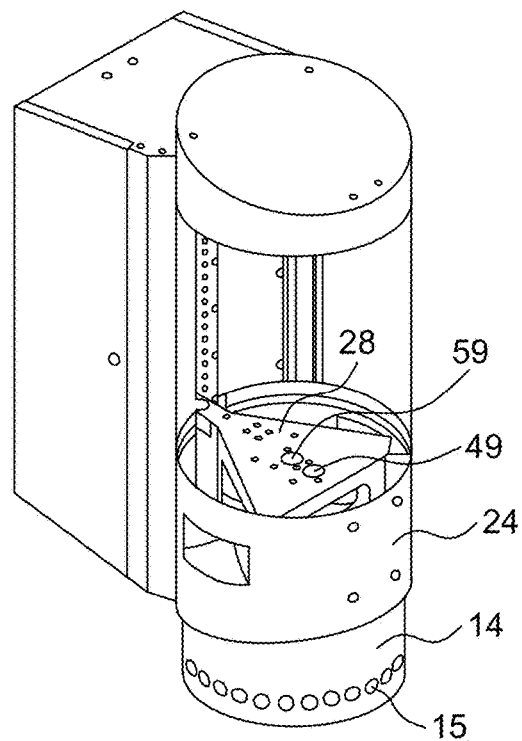
FIG. 3 illustrates one embodiment of the cabinet without a cabinet door.

FIG. 3 shows the cabinet 4 without the cabinet door. Below the cabinet door level, the cabinet 4 comprises two main parts with a circular periphery; a lowermost part 14 and an intermediate part 24. The lowermost part 14 of the cabinet comprises a plurality of holes 15 around the outer bottom periphery for improving the ventilation. The intermediate part 24 of the cabinet engages with positioning cameras 16 (see FIG. 1) for identifying and guiding the positioning of the vehicle 5. The system further comprises a main frame with a triangular top surface 28 assembled to and inside the intermediate part 24 of the cabinet.

Figure 4:
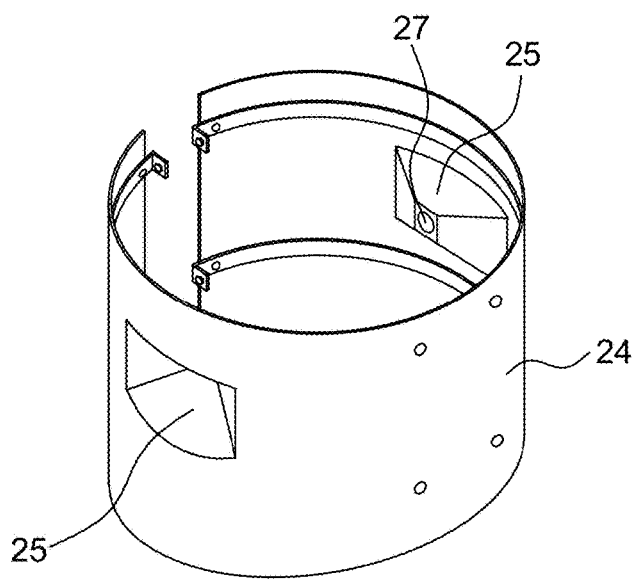
FIG. 4 shows one embodiment of a detailed view of a lower part of the cabinet.

FIG. 4 shows one embodiment of a detailed view of the intermediate part 24 of the cabinet. Two cavities 25 are located at the opposite sides of the circular intermediate part 24. Each cavity 25 has a circular opening or a hole 27. Two positioning cameras (not shown) are assembled to the inner side of the intermediate part 24 of the cabinet 4 such that the cameras can capture images through the circular opening 27 with a wide-angle enabled by the cavity 25.

Figure 5A:
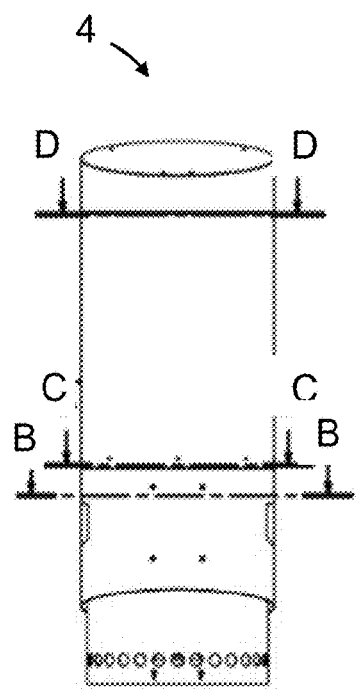
FIG. 5a illustrates one embodiment of the cabinet and three cross section locations.
Figure 5B:
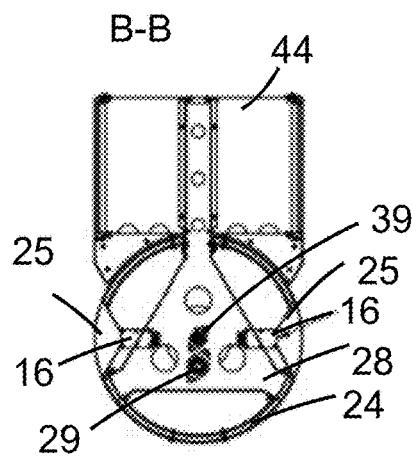
FIG. 5b-d are detailed cross section views of embodiments of the cabinet.
Figure 5C:
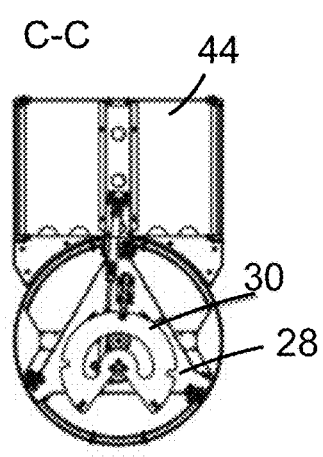
Figure 5D:
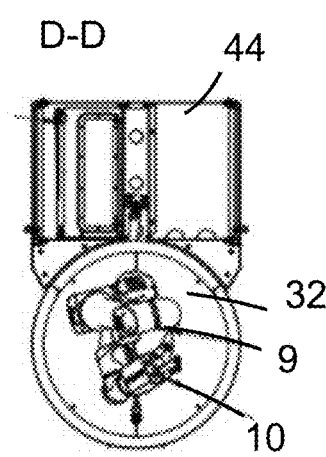

FIG. 5a is one embodiment of the cabinet with a detail of cross section locations, specifically three different heights for cross sectional 2D top view. FIG. 5b shows two positioning cameras 16 below the triangular top surface 28 on either side of the circular intermediate part 24 of the cabinet 4. On the triangular top surface 28, there are two holes 49, 59 (shown in FIG. 3) for engaging with two rods 29, 39, respectively, such that a basis for carrying the robot arm, a mechanism for an extra degree of freedom of the robot arm and a mechanism for turning the door of the cabinet are provided. Central rod 39 has an axis of rotation at the centre of the intermediate plate 24. The offset rod 29 has an offset to the central rotary axis for providing an extra reach to the robot arm and is connected to a circular plate 30, shown in FIG. 5c. Rotational axis of the circular plate 30 is same as the rotational axis of the offset rod 29. Above the circular plate 30, a rotatable table 32 having a larger diameter than the circular plate 30 is assembled as shown in FIG. 5d. The circular plate 30 and the rotatable table 32 are connected with a gear ratio, such that a combined rotation of the tables corresponds to a total rotational movement.

While the centre of rotation of the circular plate 30 corresponds to the rotational centre of the offset rod 29, the rotatable table 32 rotates around the central rod 39 of the circular intermediate part 24. Robot arm 9 and the adaptor tool 10 are assembled on the rotatable table 32 as shown in FIG. 5d.

Figure 6:
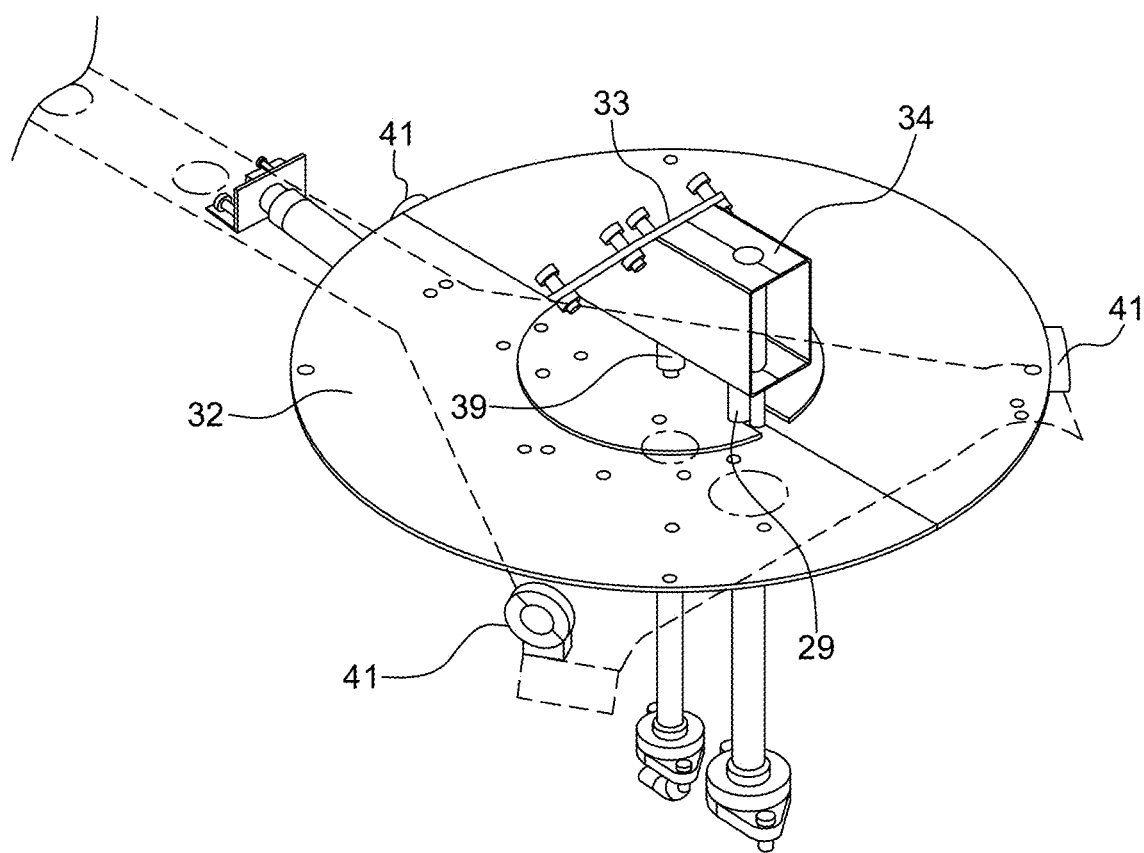
FIG. 6 shows one embodiment of the rotary table assembly.

An embodiment of the rotatable table assembly is shown in FIG. 6. The rotatable table 32 is in a relation with the cabinet door 34 by means of rollers 41 such that when the rotatable table 32 rotates e.g., counter-clockwise, the cabinet door 34 opens counter-clockwise simultaneously.

Furthermore, the rotary table 32 engages with a connector block 34 by means of the offset rod 29. The connector block 34 has a side surface 33 with an angle of e.g., 45° (between 30° and 60° is a suitable range) relative to the rotation axis of the offset rod 29. The robot arm 9 (see FIG. 5d) is assembled to the side surface 33 of the connector block 34. When the refuelling system is activated, the offset rod 29 rotates; thereby the connector block 34 rotates. The rotation around the offset rod 29 provides an extra reach to the robot arm such that the robot arm can operate at least a second or at least a third or at least a fourth dispenser unit of the fuel island. When the system is configured for operating an opposite side of the fuel island, the rotary table 32 rotates around the central rod 39, providing an extra degree of freedom to the system.

Figure 7:
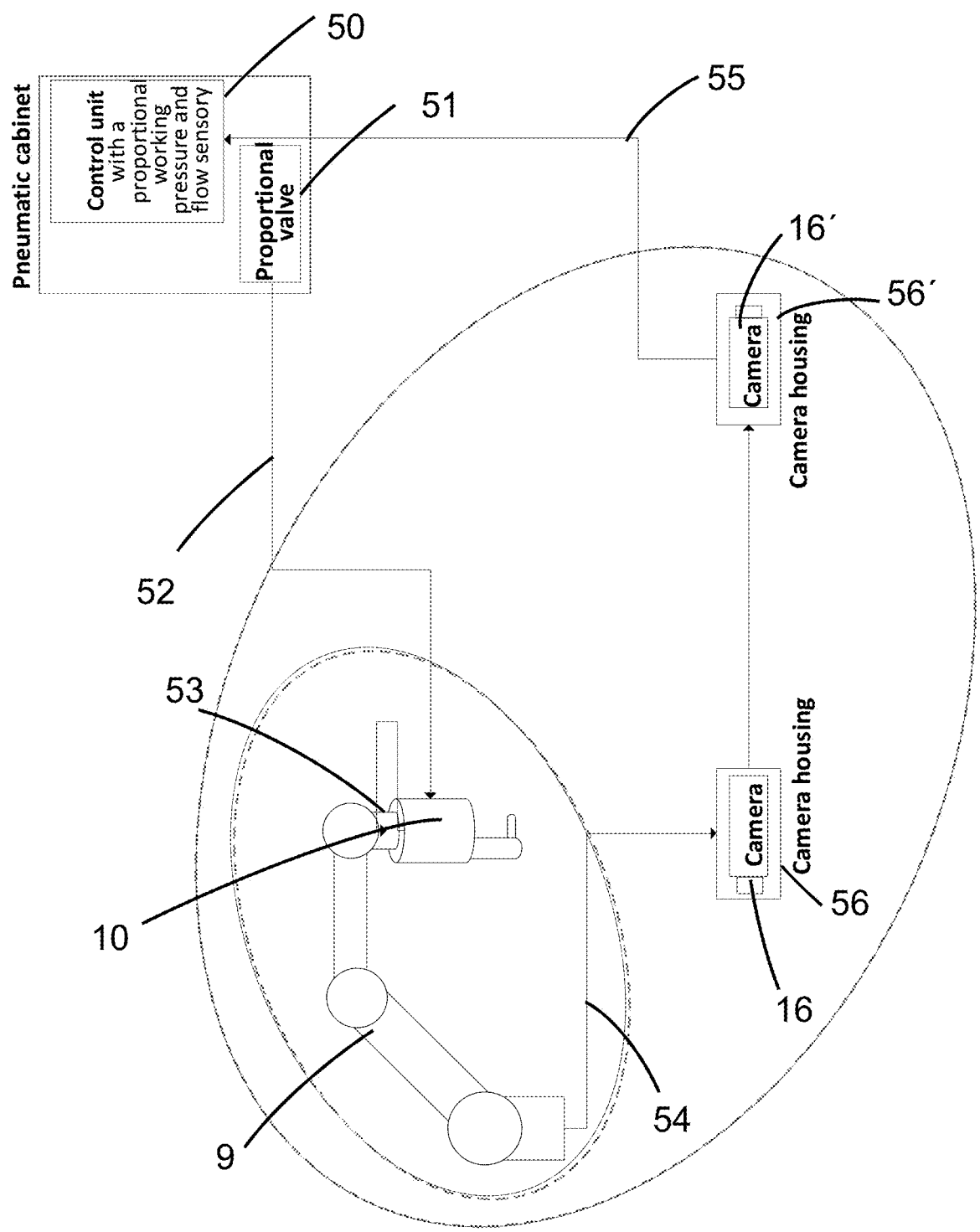
FIG. 7 illustrates one embodiment of a pressurization system.

An embodiment of a purge and pressurization system is shown in FIG. 7. Purge and pressurization system comprises a valve 51 for providing a pressurized air by means of a first tube 52. The first tube 52 has a diameter of 8 mm and a length of 5 m, and extends from the valve 51 and connects to the adaptor tool 10. The adaptor tool 10 has an airtight housing body, or a non-airtight housing body, accommodating the electronics of the adaptor tool 10, such as a positioning camera 36 (shown in FIG. 1). A second tube 53 of 40 mm in length and 8 mm in diameter connects the adaptor tool 10 to the collaborative robot arm 9. The pressurized air runs through the entire length of the robot arm 9 to the bottom of the robot arm 9 from where at least a third tube 54 connects the robot arm 9 to a first camera 16 at the bottom of the cabinet. The camera 16 is provided with an airtight camera housing 56 enclosing the camera 16 or with a non-airtight camera housing 56 enclosing the camera 16. The tubing system has at least a fourth tube connecting the camera housing 56 on one side of the fuel island to a second camera housing 56', at the bottom of the cabinet on the opposite side of the fuel island, accommodating a second camera 16'. Finally, an exit tube 55 extends from the second camera housing to the control unit 50 configured for detecting the level of pressurized air.

The dashed lines in FIG. 7 indicate the zone classification in an explosive environment. Considering the zone classification system of a variety of regions and countries, the adaptor tool 10, the robot arm 9 and cameras 16, 16' are identified to be in ATEX zone 2 defining a medium to low risk. When the robot arm 9 and the adaptor tool 10 operate during refuelling operation such that the adapter tool 10 engages with a fuel dispenser unit of the fuel station and refuel the vehicle, the zone classification of the adaptor tool 10, and the robot arm 9 can be in ATEX zone 1, in a higher risk of explosion area.

Purge and pressurization system thereby the tubing, pressurization level and purging level can take the variation in zones into account. The presently disclosed robotic refuelling system therefore can fulfil safety requirements while offering an automatic refuelling operation in a collaborative workspace.

ITEMS

1. A Robotic Refuelling System for Automatically Operating a Fuel Station for refuelling vehicles, comprising:
   A first detection unit for identifying the vehicle,
   A robot arm,
   An adapter tool connected to the robot arm,
   wherein the system is configured for
      detecting and identifying the vehicle, and
      controlling the robot arm and the adapter tool to engage at least one fuel dispenser unit of the fuel station and refuel the vehicle.

2. The system according to item 1, wherein the robot arm is a collaborative robot arm.

3. The system according to any of the preceding items, wherein the robot arm is configured to operate without a separate external safety system.

4. The system according to any of the preceding items, wherein the robot arm is pressurised such that a predefined pressure level is maintained.

5. The system according to any of the preceding items, wherein the robot arm comprises a sleeve surrounding at least a part of the robot arm.

6. The system according to any of the preceding items, wherein said adapter tool comprises a connector configured to connect to the fuel dispenser unit.

7. The system according to any of the preceding items, wherein said adapter tool further comprises a fuel door-operating device configured to engage with a fuel door of the vehicle.

8. The system according to any of the preceding items, wherein the system is further configured to start, monitor and finish a refuelling process such that the system is transmitting and receiving data signals, the data concerning the refuelling procedure.

9. The system according to any of the preceding items, wherein the system is configured to monitor and communicate the positioning of the vehicle in accordance with the fuel dispenser unit.

10. The system according to any of the preceding items, wherein a second detection unit is configured to identify a wheel of the vehicle such that the positioning of the vehicle is determined.

11. The system according to item 10, wherein the second detection unit is configured for capturing an image of at least a rear wheel and/or a front wheel of the vehicle for determining the position of the vehicle.

12. The system according to items 10-11, wherein the system is configured for locating the fuel door of the vehicle based on the captured image by the second detection unit.

13. The system according to any of the preceding items, wherein the adaptor tool further comprises a third detection unit for monitoring the positioning of the fuel dispenser in the fuel door.

14. The system according to any of the preceding items, wherein the system is adaptable to conventional fuels such as to petrol, diesel or non-conventional fuels such as hydrogen, electricity.

15. The system according to any of the preceding items, wherein the system further comprises a cabinet configured to accommodate the collaborative robot arm.

16. The system according to any of the preceding items, wherein the cabinet comprises at least one hole on at least one outer lower surface and at least one hole on at least one outer upper surface 17. The system according to any of the preceding items, wherein the cabinet further comprises a rotary and/or slidable table configured to carry the collaborative robot arm.

18. The system according to item 17, wherein the table is configured to rotate at least 180°.

19. The system according to any one of items 17-18, wherein the robot arm is attached to the table at an angle between 1°-90°, preferably between 20°-70°, more preferably between 30°-60° and the most preferably at an angle of 45° relative to the normal of the table.

20. The system according to any one of items 17-19, wherein the robot arm engages with a rotary table with an offset.

21. The system according to item 20, wherein the offset is at least 25 mm, preferably at least 50 mm, more preferably at last 75 mm, and more preferably 100 mm, and most preferably 150 mm.

22. The system according to any of the items 2-21, further comprising a pressurization system.

23. The system according to item 22, wherein the pressurization system is configured for pressurising the collaborative robot arm and/or the adaptor tool and/or a detection unit, such as a camera, and optionally for maintaining a predefined pressure level above atmospheric pressure.

24. The system according to item 23, wherein the predefined pressure level is at least 0.8 mbar above atmospheric pressure, preferably between 0.8 mbar-15 mbar, more preferably between 1 mbar-10 mbar, most preferably between 2 mbar-5 mbar, alternatively the predefined pressure level is at least 2 mbar above atmospheric pressure.

25. The system according to items 22-24, wherein the pressurization system can be configured to purge the collaborative robot arm and/or the adaptor tool and/or a detection unit prior to automatic refuelling operation if the system was turned off.

26. The system according to item 25, wherein the purging volume is between 50-100 l.

27. The system according to items 22-26, wherein the gas is air.

28. Use of the robotic refuelling system according to any one of the items 1-26 for refuelling vehicles.

29. A method for automatically refuelling vehicles, comprising the steps of
providing a first detection unit for identifying a vehicle,
providing a robot arm connected to an adaptor tool,
engaging the adaptor tool with at least one fuel dispenser unit,
refuelling the vehicle by controlling the robot arm and the adaptor tool for engaging the fuel dispenser unit with a refuelling inlet of the vehicle.

30. A method for automatically refuelling vehicles, wherein the method comprises the step of adapting a system as claimed in any one of the items.

31. A collaborative robot arm for being used in an explosive environment, wherein the collaborative robot arm comprises electronics contained in one or more housings with one or more openings and a pressurization system configured for pressurizing the housing(s) with a gas at a predefined pressure level above atmospheric pressure.

32. The collaborative robot arm according to item 31, wherein the predefined pressure level is at least 0.8 mbar above atmospheric pressure, preferably between 0.8 mbar-15 mbar, more preferably between 1 mbar-10 mbar, most preferably between 2 mbar-5 mbar, alternatively the predefined pressure level is at least 2 mbar above atmospheric pressure.

33. The collaborative robot arm according to items 31-32, wherein the pressurization system is configured for purging the collaborative robot arm by a predefined purge volume of the gas before electronics of the collaborative robot arm is reactivated.

34. The collaborative robot arm according to item 33, wherein the purge volume is between 10-200 l, preferably 20-150 l, more preferably 30-100 l, most preferably between 50-90 l.

35. The collaborative robot arm according to items 31-34, wherein the gas is air.

The invention claimed is:

1. A robotic refuelling system for automatically operating a fuel station for refuelling vehicles, comprising:
a first detection unit for identifying the vehicle;
a collaborative robot arm;
an adapter tool connected to the collaborative robot arm;
a pressurization system configured to purge the collaborative robot arm and/or the adaptor tool and/or the first detection unit prior to automatic refuelling operation if the robotic refuelling system was turned off, the pressurization system configured for purging the collaborative robot arm by a predefined purge volume before electronics of the collaborative robot arm is reactivated, wherein the purging volume is at least 10 l;

wherein the robotic refuelling system is configured for;
    detecting and identifying the vehicle, and
    controlling the collaborative robot arm and the adapter tool to engage at least one fuel dispenser unit of the fuel station and refuel the vehicle.

2. The robotic refuelling system according to claim 1, wherein the robot arm is configured to operate without a separate external safety system.

3. The robotic refuelling system according to claim 1, wherein the collaborative robot arm is pressurised such that a predefined pressure level is maintained.

4. The robotic refuelling system according to claim 1, wherein the collaborative robot arm comprises a sleeve surrounding at least a part of the collaborative robot arm.

5. The robotic refuelling system according to claim 1, wherein said adapter tool comprises a connector configured to connect to the fuel dispenser unit.

6. The robotic refuelling system according to claim 1, wherein said adapter tool further comprises a fuel door-operating device configured to engage with the fuel door of the vehicle.

7. The robotic refuelling system according to claim 1, wherein the robotic refuelling system is configured to monitor and communicate the positioning of the vehicle in accordance with the fuel dispenser unit.

8. The robotic refuelling system according to claim 1, wherein the robotic refuelling system further comprises a second detection unit configured to identify a wheel of the vehicle, such that the positioning of the vehicle is determined.

9. The robotic refuelling system according to claim 1, wherein the robotic refuelling system is configured for capturing an image of at least a rear wheel and/or a front wheel of the vehicle for determining the position of the vehicle.

10. The robotic refuelling system according to claim 9, wherein the robotic refuelling system is configured for locating the fuel door of the vehicle based on the captured image by the second detection unit.

11. The robotic refuelling system according to claim 1, wherein the robotic refuelling system further comprises a rotary and/or slidable table configured to carry the collaborative robot arm, wherein the table is configured to rotate around an axis of rotation.

12. The robotic refuelling system according to claim 11, wherein the table is configured to rotate at least 180°.

13. The robotic refuelling system according to claim 11, wherein the collaborative robot arm is attached to the table at an angle between 10°-80° relative to the axis of rotation.

14. The robotic refuelling system according to claim 11, wherein the collaborative robot arm engages with the table with an offset of at least 25 mm in relation to the axis of rotation of the table.

15. The robotic refuelling system according to claim 14, wherein the offset is at least 75 mm.

16. The robotic refuelling system according to claim 1, wherein the robotic refuelling system is adaptable to conventional fuels or non-conventional fuels.

17. The robotic refuelling system according to claim 1, wherein the pressurization system is further configured maintaining a predefined pressure level above atmospheric pressure.

18. The robotic refuelling system according to claim 17, wherein the predefined pressure level is at least 0.8 mbar above atmospheric pressure.

19. The robotic refuelling system according to claim 1, wherein the gas is air.

20. The robotic refuelling system according to claim 1, wherein the collaborative robot arm fulfils conditions of at least one of the standards ISO 10218-1,10218-2 and ISO/TS 15066.

21. The robotic refuelling system according to claim 1, for being used in an explosive environment, wherein the electronics are contained in one or more housings with one or more openings and the pressurization system are configured for pressurizing the housing(s) with a gas at a predefined pressure level above atmospheric pressure.

22. The robotic refuelling system according to claim 21, wherein the predefined pressure level is at least 0.8 mbar above atmospheric pressure.

23. The robotic refuelling system according to claim 1, wherein the purging volume is in the range of 20-100 µl.

24. The robotic refuelling system according to claim 1, wherein the purging volume is in the range of 50-100 µl.

25. A method for automatically refuelling vehicles, comprising the steps of:
    providing a first detection unit for identifying a vehicle;
    providing a collaborative robot arm connected to an adaptor tool;
    providing a pressurization system;
    engaging the adaptor tool with at least one fuel dispenser unit; and
    refuelling the vehicle by controlling the collaborative robot arm and the adaptor tool for engaging the fuel dispenser unit with a refuelling inlet of the vehicle; and
    purging, by the pressurization system, the collaborative robot arm and/or the adaptor tool and/or the first detection unit prior to automatic refuelling operation if the robotic refuelling system was turned off, and purging the collaborative robot arm by a predefined purge volume before electronics of the collaborative robot arm is reactivated, wherein the purging volume is at least 10 l.

26. A robotic refuelling system for automatically operating a fuel station for refuelling vehicles, comprising:
    a first detection unit for identifying the vehicle;
    a collaborative robot arm configured to operate in close proximity to humans, the collaborative robot arm having a weight of less than 70 kg;
    an adapter tool connected to the collaborative robot arm;
    wherein the robotic refuelling system is configured for;
        detecting and identifying the vehicle, and
        controlling the collaborative robot arm and the adapter tool to engage at least one fuel dispenser unit of the fuel station and refuel the vehicle.

27. The robotic refuelling system according to claim 26, wherein the collaborative robot arm has a an operating speed of less than 250 mm/s, the system further comprising force sensors for ensuring safe behavior in close proximity to humans.

* * * * *